US011046560B2

(12) United States Patent
Koyahata

(10) Patent No.: US 11,046,560 B2
(45) Date of Patent: Jun. 29, 2021

(54) SWINGABLE CONNECTION STRUCTURE AND CRANE PROVIDED WITH SWINGABLE CONNECTION STRUCTURE

(71) Applicant: KOBELCO CONSTRUCTION MACHINERY CO., LTD., Hiroshima (JP)

(72) Inventor: Akira Koyahata, Hyogo (JP)

(73) Assignee: KOBELCO CONSTRUCTION MACHINERY CO., LTD., Hiroshima (JP)

( * ) Notice: Subject to any disclaimer, the term of this patent is extended or adjusted under 35 U.S.C. 154(b) by 100 days.

(21) Appl. No.: 16/418,661

(22) Filed: May 21, 2019

(65) Prior Publication Data

US 2019/0359456 A1 Nov. 28, 2019

(30) Foreign Application Priority Data

May 23, 2018 (JP) ............................ JP2018-098823

(51) Int. Cl.
*B66C 23/62* (2006.01)
*F16B 5/00* (2006.01)
(Continued)

(52) U.S. Cl.
CPC .............. *B66C 23/62* (2013.01); *B66C 23/36* (2013.01); *F16B 5/0004* (2013.01); *B66C 23/60* (2013.01)

(58) Field of Classification Search
CPC ......... B66C 23/62; B66C 23/36; B66C 23/60; B66C 23/82; F16B 5/0004; F16B 7/0426;
(Continued)

(56) References Cited

U.S. PATENT DOCUMENTS 5,199,586 A * 4/1993 Pech ........................ B66C 23/70 212/175
5,230,229 A * 7/1993 Stadelmann ............ D06F 37/20 403/157
5,332,328 A * 7/1994 Yang ..................... B60S 1/4003 15/250.32

FOREIGN PATENT DOCUMENTS

EP 1418151 A1 * 5/2004 ............. B66C 23/78
JP S58-25359 U 2/1983
(Continued)

OTHER PUBLICATIONS

Machine Translation of JP 5188349B2 (Year: 2013).*
(Continued)

*Primary Examiner* — Michael R Mansen
*Assistant Examiner* — Juan J Campos, Jr.
(74) *Attorney, Agent, or Firm* — Oblon, McClelland, Maier & Neustadt, L.L.P.

(57) ABSTRACT

Provided is a swingable connection structure capable of detachably connecting a first member and a second member to each other easily. The swingable connection structure has a first member, a second member, and a swing holding member, and the second member is swingably connected to the first member. The first member has a swing shaft which defines a swing center axis of the second member, and the second member has a pivotally supported portion which receives the swing shaft. The swing holding member is mounted on a side surface of the second member in a rotatable manner, and the swing holding member is provided with a constraining hole which allows insertion of one end portion of the swing shaft received by the pivotally supported portion.

7 Claims, 5 Drawing Sheets

5 17 20 5S 13 12A 5T 12 11S 11 10 11 21 14 L 12B 12C 15 21 21 17A 17S 18 16 19 17B

(51) Int. Cl.
*B66C 23/36* (2006.01)
*B66C 23/60* (2006.01)

(58) Field of Classification Search
CPC ..... Y10T 403/32861; Y10T 403/32877; Y10T 403/32885; Y10T 403/32893; Y10T 403/32901
See application file for complete search history.

(56) References Cited

FOREIGN PATENT DOCUMENTS

| | | | | | |
|---|---|---|---|---|---|
| JP | S60-19591 | U | | 2/1985 | |
| JP | 11193542 | A | * | 7/1999 | ................ E02F 3/38 |
| JP | 2011-46503 | A | | 3/2011 | |
| JP | 2013023905 | A | * | 2/2013 | .............. E02F 3/369 |
| JP | 5188349 | B2 | | 4/2013 | |
| JP | 2018040155 | A | * | 3/2018 | ................ E02F 3/38 |
| WO | WO-9733049 | A1 | * | 9/1997 | .............. E02F 3/382 |

OTHER PUBLICATIONS

Notice of Reasons for Refusal dated Mar. 17, 2020 in corresponding Japanese Patent Application No. 2018-098823 (with English translation)(5 pages).

* cited by examiner

L
21
14
11
10
11
11S
12
5T
12A
12B
12C
15
17A
13
5S
21
17S
20
21
18
16
17B
19
17
5

SWINGABLE CONNECTION STRUCTURE AND CRANE PROVIDED WITH SWINGABLE CONNECTION STRUCTURE

BACKGROUND

The present invention relates to a swingable connection structure and a crane provided with the swingable connection structure.

There has been popularly adopted a swingable connection structure for swingably and detachably connecting a second member to a first member. In this case, a connection hole is formed in a connecting portion of the first member and an end portion of the second member respectively, and a swing shaft (pin) is inserted into these connection holes.

Such a swingable connection structure is also applicable to the connection of a heavy object such as a working machine. For example, in the case where a mast is swingably mounted on a crane body, a slewing body of the crane body composes the first member, and the mast composes the second member. In the case where the second member having a large weight is connected to the first member having a large weight in this manner, an operation of positioning the end portion of the second member with respect to the first member cannot be performed easily. Further, in such a case, the swing shaft used in the connecting operation also becomes a heavy object and hence, there is a concern that the operation of connecting the second member to the first member becomes more difficult.

In view of the above, Japanese Patent No. 5,188,349 discloses a swingable connection structure which can prevent removal of a swing shaft from a U-shaped groove. In this technique, the U-shaped groove which opens upward is formed in the first member, the swing shaft is mounted on an end portion of a second member in advance, and the swing shaft is inserted into the U-shaped groove from above. Further, a rotatably mounted fixing member is provided to the swing shaft, and a pin is inserted into a distal end portion of the fixing member and the first member in a penetrating manner so that the removal of the swing shaft from the U-shaped groove is prevented.

In the above-mentioned technique, the fixing member is mounted on the swing shaft and hence, when the swing shaft is inserted into the U-shaped groove from above, there is a concern that the fixing member hangs down from the swing shaft thus obstructing the connecting operation. Further, the fixing member is mounted on the swing shaft inside the second member such that the fixing member is disposed adjacently to the first member in the connecting operation. Accordingly, an operation of fastening the fixing member to the first member by a pin needs to be performed under the suspended second member. Such an operation is not favorable when safety is taken into consideration.

It is an object of the present invention to provide a swingable connection structure and a crane capable of detachably connecting a first member and a second member to each other easily.

SUMMARY

The present invention provides a swingable connection structure for swingably connecting a first member and a second member to each other, the swingable connection structure comprising: a first connecting portion which forms a portion of the first member; a second connecting portion which forms a portion of the second member, and is connected to the first connecting portion in a swingable manner about a horizontal swing center axis; and a swing holding member which holds a swingable state of the second connecting portion with respect to the first connecting portion. The first connecting portion has a swing shaft which extends in a horizontal direction and in which a center axis of the swing shaft forms the swing center axis, the second connecting portion has: a pair of side surfaces which respectively intersect with an axial direction of the swing shaft and are arranged on sides opposite to each other; a connecting surface which connects the pair of side surfaces to each other along the axial direction; and a pivotally supported portion which is disposed on the connecting surface of the second member, receives the swing shaft along a direction orthogonal to the axial direction, and is fitted on the swing shaft such that the second connecting portion is swingable about the swing center axis, the swing holding member includes: a first end portion which is supported on one side surface out of the pair of side surfaces of the second connecting portion in a rotatable manner about a horizontal rotary center axis; and a second end portion which is disposed on a side opposite to the first end portion, the second end portion being provided with a constraining hole which allows insertion of one end portion of the swing shaft in an axial direction along the axial direction, and in a state where the one end portion of the swing shaft is inserted into the constraining hole, the swing holding member constrains a relative position of the second connecting portion with respect to the swing shaft in a radial direction of the swing shaft, and the swing holding member swings together with the second connecting portion about the swing center axis.

Further, the present invention provides a crane having the above-mentioned swingable connection structure.

DETAILED DESCRIPTION

Hereinafter, an embodiment of the present invention is described in detail with reference to drawings as necessary.

<Regarding Crane>

Figure 1:
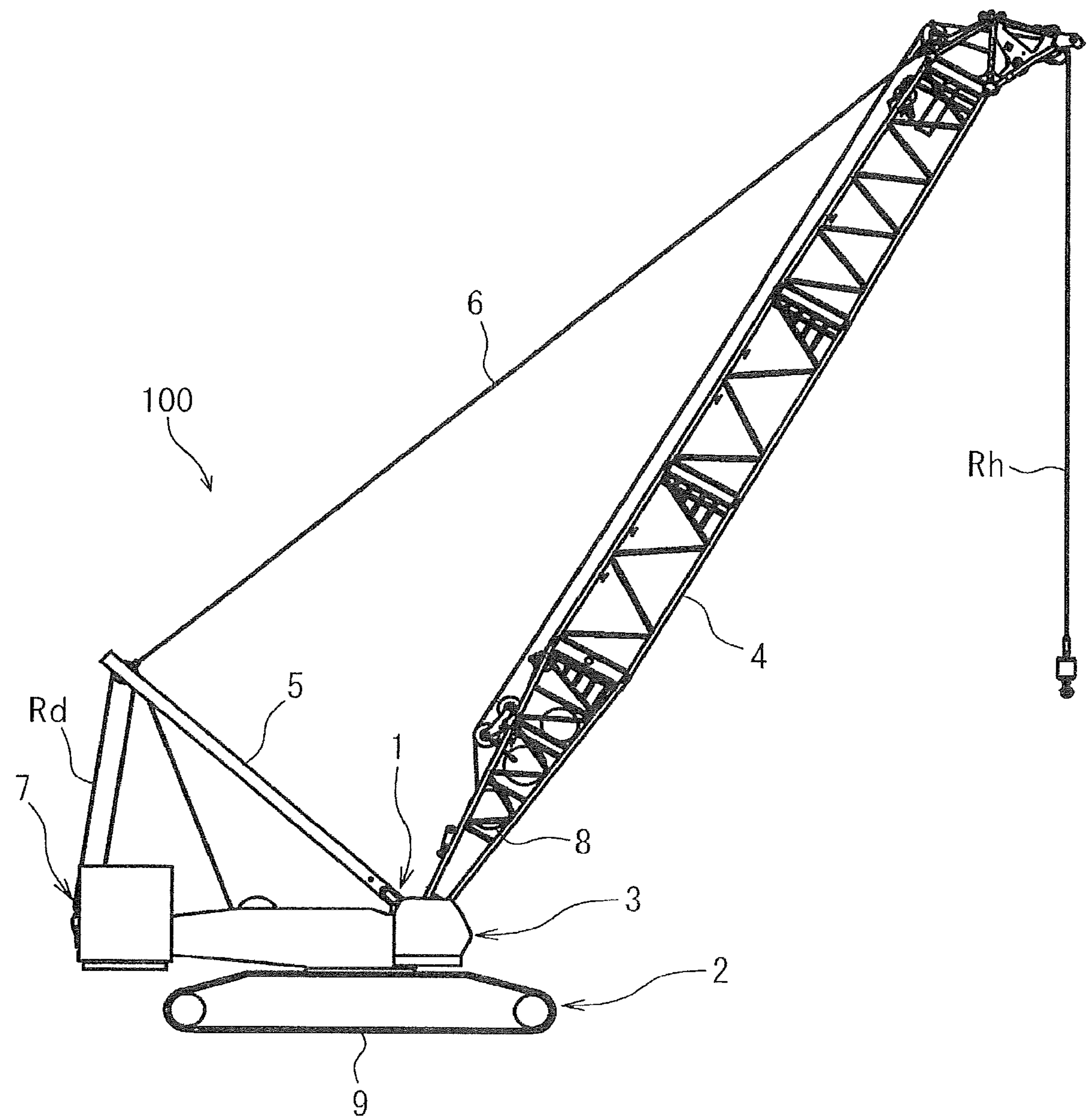
FIG. 1 is a schematic side view showing a crane according to one embodiment of the present invention.

FIG. 1 shows a crane 100 (working machine) according to one embodiment of the present invention. The crane according to this embodiment includes swingable connection structures 1.

The crane 100 shown in FIG. 1 includes: a lower traveling body 2 which can travel on a ground by itself; an upper slewing body 3 (first member) which is mounted on the lower traveling body 2 in a horizontally rotatable manner, in other words, in a slewable manner about a slewing center axis extending in a vertical direction; a boom 4 which is mounted on a front portion of the upper slewing body 3 in a swingable manner (in such a manner that the boom 4 can be raised or lowered) in frontward and rearward directions; masts 5 (second members, derrick bodies) which are mounted on the upper slewing body 3 at a position close to a mounting portion of the boom 4 and behind the mounting portion on the upper slewing body 3 in a swingable manner (in such a manner that the masts 5 can be raised or lowered) in frontward and rearward directions by the swingable connection structures 1; a pair of left and right guy lines 6 which connect a distal end portion of the boom 4 and distal end portions of the masts 5 to each other; a derrick mechanism 7 which is mounted on a rear portion of the upper slewing body 3 for raising and lowering the masts 5 using a derrick rope Rd; a winding winch 8 which is disposed in the vicinity of a proximal end portion of the boom 4 and is provided for winding a hanging rope Rh which is hung down from the distal end portion of the boom 4 for hoisting a hanging load; and a fixing member 17 (swing holding member) described later which fixes the upper slewing body 3 and the masts 5 to each other.

The lower traveling body 2 has a pair of crawlers 9 as a traveling device.

The upper slewing body 3 supports the mast 5 and the derrick mechanism 7 provided for raising or lowering the boom 4. The upper slewing body 3 defines a direction that the boom 4 is raised or lowered due to its rotation in a horizontal direction.

The boom 4 defines a horizontal position at which the hanging rope Rh is suspended downward due to the horizontal rotation of the upper slewing body 3 and raising or lowering of the boom 4 about an end portion of the boom 4 held by the upper slewing body 3.

Distal end portions of the masts 5 are connected to the boom 4 by the guy lines 6 so that the masts 5 are raised or lowered integrally with the boom 4. Each mast 5 may be formed by connecting angular pipe members in a frame shape or in a ladder shape, for example.

With respect to the pair of swingable connection structures 1, both ends in a width direction (lateral direction) of one end portion (proximal end portion) in a longitudinal direction of the mast 5 are connected to the upper slewing body 3 respectively. A plurality of sheaves for folding back the derrick rope Rd are disposed in the vicinity of the other end portions (distal end portions) in the longitudinal direction of the masts 5.

The derrick mechanism 7 changes a distance from the upper slewing body 3 to upper end portions of the masts 5 by adjusting a length of the derrick rope Rd which is wound around sheaves provided to the mast 5. With such an operation, the masts 5, eventually the boom 4 which is connected to the masts 5 by the guy lines 6 are raised or lowered.

<Regarding Swingable Connection Structures>

Figure 2:
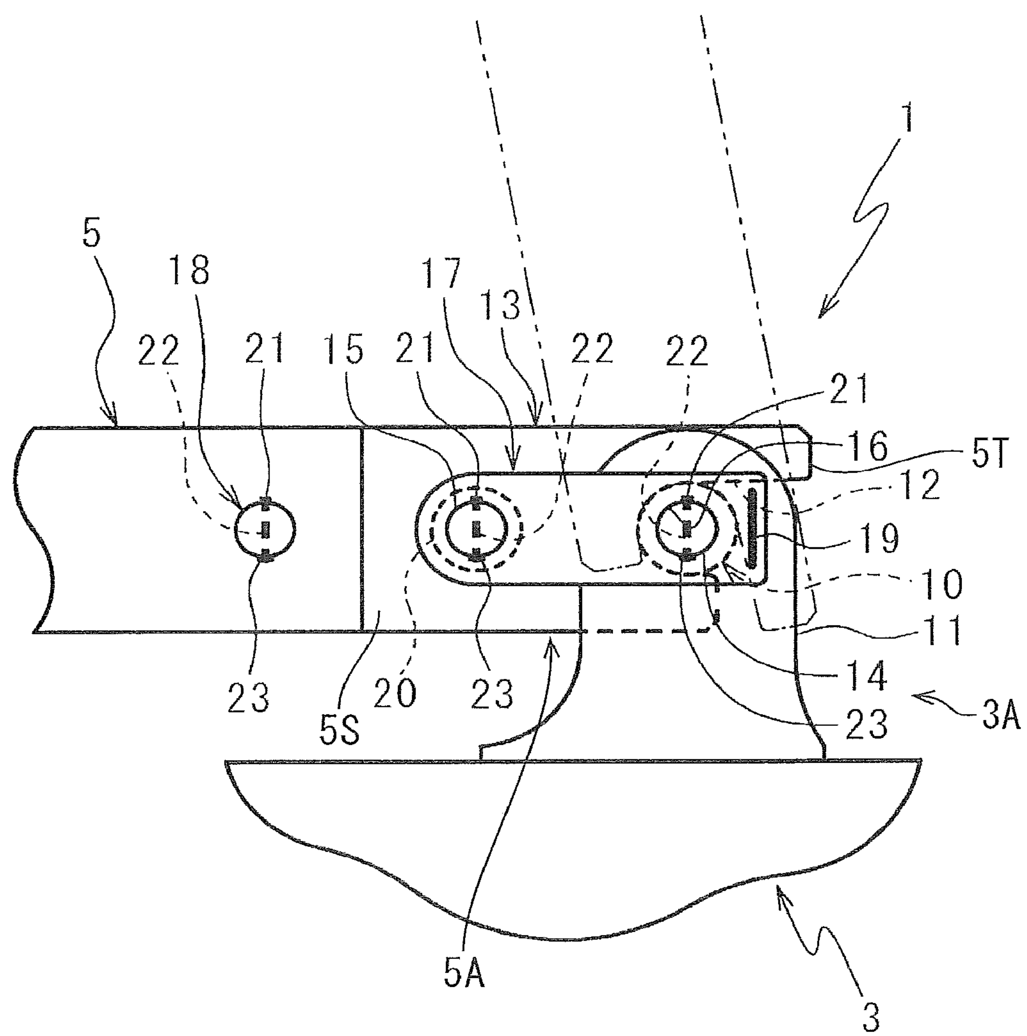
FIG. 2 is a schematic side view of a swingable connection structure (mast connecting portion) of the crane shown in FIG. 1.
Figure 3:
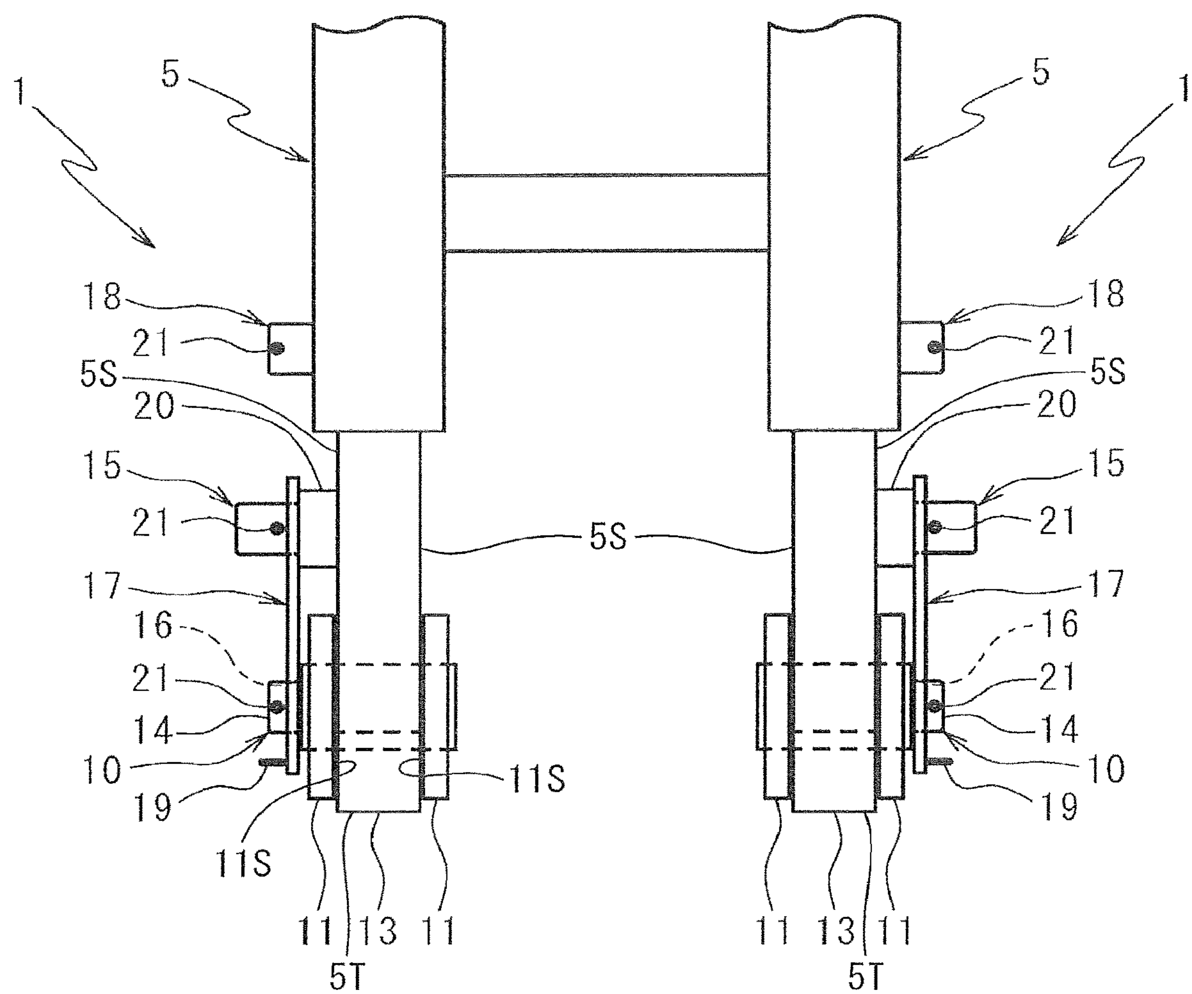
FIG. 3 is a schematic plan view of the swingable connection structure shown in FIG. 2.

FIG. 2 is a schematic side view of the swingable connection structure 1 (mast connecting portion) of the crane 100 shown in FIG. 1. FIG. 3 is a schematic plan view of the swingable connection structures 1 shown in FIG. 2. As shown in FIG. 2 and FIG. 3, in this crane 100, the masts 5 are connected to the upper slewing body 3 by the pair of left and right swingable connection structures 1. The upper slewing body 3 has a first connecting portion 3A, and the masts 5 have a second connecting portion 5A. That is, each swingable connection structure 1 includes a first connecting portion 3A which composes a portion of the upper stewing body 3 as the first member, and the second connecting portion 5A which composes a portion of the mast 5 as the second member.

The upper slewing body 3 (first connecting portion 3A) includes: swing shafts 10 having a center axis which defines a swing center axis L (see FIG. 4) of the masts 5; and pairs of first protruding portions 11 (swing shaft support portions) each of which holds the swing shaft 10 such that the swing shaft 10 extend in a horizontal direction. The pair of first protruding portions 11 are disposed spaced apart from each other in the axial direction of the swing shaft 10, and is firmly mounted on a frame of the upper slewing body 3. On the other hand, with respect to the masts 5, a recessed portion 12 (pivotally supported portion) which receives the swing shaft 10 is formed on the mast 5. The mast 5 has a second protruding portion 13 which is inserted between the pair of first protruding portions 11. The second protruding portion 13 has a pair of side surfaces 5S and a distal end surface 5T (connecting surface), and is supported on the swing shaft 10 between the pair of first protruding portions 11.

Specifically, the mast 5 has: the pair of side surfaces 5S which respectively intersect with the axial direction of the swing shaft 10 and are arranged on sides opposite to each other; and the distal end surface 5T which connects the pair of side surfaces 5S to each other. The recessed portion 12 which receives the swing shaft 10 and is swingably and pivotally supported on the swing shaft 10 about the swing center axis L is formed on the distal end surface 5T of the mast 5 in a state where the recessed portion 12 penetrates the pair of side surfaces 5S.

On the other hand, each of the first protruding portions 11 has a constraining surface 11S which constrains the mast 5 in the axial direction of the swing shaft 10.

In the swingable connection structure 1, the second protruding portion 13 is inserted between the pair of first protruding portions 11, and the recessed portion 12 of the second protruding portion 13 engages with (is fitted on) the swing shaft 10 which is held by the pair of first protruding portions 11 in a both-end supported manner. With such a configuration, the mast 5 is swingably connected to the upper slewing body 3. In this case, the pair of side surfaces 5S are disposed so as to respectively opposedly face the constraining surfaces 11S of the pair of first protruding portions 11 in the axial direction of the swing shaft 10.

In this manner, in the swingable connection structure 1, the upper slewing body 3 (first connecting portion 3A) which forms the first member is used as a female body having the pair of first protruding portions 11, and the masts 5 (second connecting portions 5A) which form the second member detachably mounted on the first member are used as a male body. In this manner, by using the upper slewing body 3 having the swing shaft 10 as the female body and by using the masts 5 as the male body, it is possible to easily perform an operation of making the masts 5 engage with the upper slewing body 3 by hoisting the masts 5 using an auxiliary crane for assembling the masts 5.

The first protruding portions 11 and the second protruding portion 13 can be formed into a plate shape respectively. The first protruding portions 11 and the second protruding portion 13, particularly, the second protruding portion 13 may have a hollow box-shaped structure or may be formed by laminating a plurality of plate members so as to obtain sufficient rigidity at a relatively low cost. Here, "plate shape" means a shape where a thickness is fixed and a width (a size in a direction orthogonal to a thickness direction) is larger than the thickness.

The recessed portion 12 is opened on one end side of the mast 5 in the longitudinal direction. The recessed portion 12 is formed into a semicircular shape such that a deepest edge (inner peripheral surface) of the recessed portion 12 is brought into close contact with an outer peripheral surface of the swing shaft 10.

Particularly, the recessed portion 12 has a pair of inner wall surfaces 12A, 12B (FIG. 4) and an inner peripheral surface 12C which connects the pair of inner wall surfaces 12A, 12B to each other. The pair of inner wall surfaces 12A, 12B define an opening which opens with a size slightly larger than an outer diameter of the swing shaft 10 in a direction orthogonal to the axial direction of the swing shaft 10 thus allowing the swing shaft 10 to pass through the opening. The inner peripheral surface 12C defines a space which communicates with the opening and receives the swing shaft 10 which has passed through the opening. The inner peripheral surface 12C is also brought into contact with the outer peripheral surface of the swing shaft 10 thus allowing the mast 5 to swing about the swing shaft 10.

In a lying-down state of the mast 5, a distal end portion of an upper side of the recessed portion 12 (inner wall surface 12A) of the second protruding portion 13 is formed in a protruding manner so as to extend toward a swing shaft 10 side longer than a distal end portion of a lower side of the recessed portion 12 (inner wall surface 12B). That is, with respect to an inner edge of the recessed portion 12, an upper edge extending from an upper end of the deepest edge is longer than a lower edge extending from a lower end of the deepest edge.

With such a configuration, the mast 5 can be relatively easily connected to the upper slewing body 3 in such a manner that the mast 5 is hoisted by the auxiliary crane in a lying-down state, the upper edge of the recessed portion 12 is placed on the swing shaft 10, and the mast 5 is pushed such that the outer peripheral surface of the swing shaft 10 is brought into contact with the deepest edge of the recessed portion 12.

An end portion of the swing shaft 10 on one side in the axial direction (one end portion) forms a small diameter portion 14 whose outer diameter is set smaller than outer diameters of other portions of the swing shaft 10. The small diameter portion 14 protrudes in the axial direction from the outer first protruding portion 11.

The mast 5 (second connecting portion 5A) has a support shaft 15 which is fixed to the side surface 5S of the mast 5 and extends parallel to the swing shaft 10.

The fixing member 17 is mounted on the support shaft 15 in a rotatable manner and in an axially slidable manner. The fixing member 17 holds a swingable state of the second connecting portion 5A with respect to the first connecting portion 3A. A fixing hole 16 (constraining hole) is formed in the fixing member 17. The fixing hole 16 (constraining hole) allows the insertion of the small diameter portion 14 of the swing shaft 10 into the fixing hole 16 in a state where the mast 5 is connected to the upper slewing body 3. Specifically, the fixing member 17 has a first end portion 17A and a second end portion 17B. The first end portion 17A is rotatably supported on one side surface 5S out of the pair of side surfaces 5S of the mast 5 in such a manner that the first end portion 17A is rotatable about a horizontal rotary center axis. To this end, a support shaft hole portion 17S is formed on the first end portion 17A. The support shaft hole portion 17S allows the insertion of the support shaft 15 along the axial direction of the swing shaft 10. By adopting the configuration in which the support shaft 15 is inserted into the support shaft hole portion 17S along the axial direction in a slidable manner, the fixing member 17 is supported on the support shaft 15 in a rotatable manner about the rotary center axis. On the other hand, the second end portion 17B is an end portion of the fixing member 17 on a side opposite to the first end portion 17A. The fixing hole 16 which allows the insertion of one end portion in an axial direction of the swing shaft 10 (small diameter portion 14) into the fixing hole 16 in the axial direction is formed in the second end portion 17B. When the small diameter portion 14 is inserted into the fixing hole 16, the fixing member 17 constrains the relative position of the mast 5 (second connecting portion 5A) with respect to the swing shaft 10 in a radial direction of the swing shaft 10 and, at the same time, the fixing member 17 swings about the swing center axis together with the second connecting portion 5A.

In the swingable connection structure 1, by making the fixing hole 16 of the fixing member 17 engage with the small diameter portion 14 of the swing shaft 10, it is possible to prevent the removal of the swing shaft 10 from the recessed portion 12, that is, the removal of the mast 5 from the upper slewing body 3. In such a state, a straight line which connects the swing shaft 10 and the support shaft 15 is arranged parallel to the radial direction of the swing shaft 10. Accordingly, it is possible to prevent the occurrence of the case where the recessed portion 12 of the mast 5 is removed from the swing shaft 10 due to a rotational force generated by swinging of the mast 5. Accordingly, a load applied to the fixing member 17 due to the rotational force is reduced.

The mast 5 (second connecting portion 5A) has a circular-columnar-shaped holding portion 18. The holding portion 18 is disposed in a protruding manner parallel to the swing shaft 10 at the position symmetrical with the swing shaft 10 received by the recessed portion 12 with respect to the support shaft 15 disposed at the side surface 5S of the mast 5 (at the position opposite to the swing shaft 10). An outer diameter of the holding portion 18 is set equal to the outer diameter of the small diameter portion 14 of the swing shaft 10.

Figure 4:
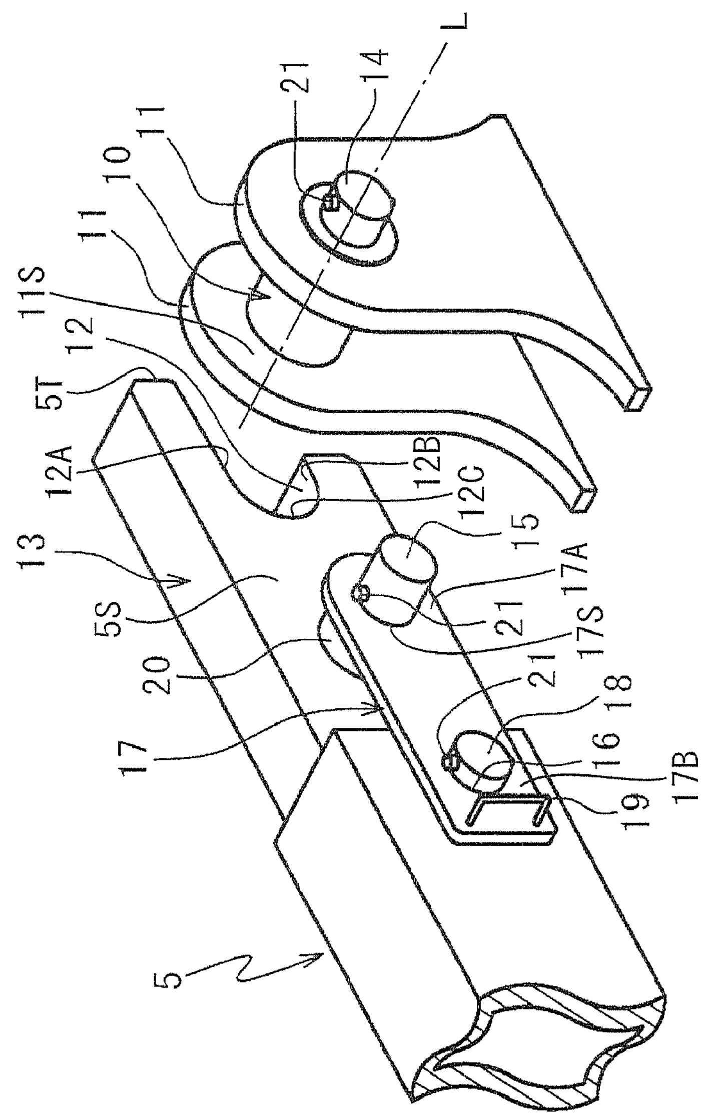
FIG. 4 is a schematic perspective view showing a disassembled state of the swingable connection structure shown in FIG. 2.

In the swingable connection structure 1, the fixing member 17 can change a posture between a first posture and a second posture. The first posture is a posture in which the fixing hole 16 of the second end portion 17B can receive the small diameter portion 14 of the swing shaft 10. The second posture is a posture in which the fixing member 17 is rotated about the rotary center axis from the first posture such that the second end portion 17B is moved away from the small diameter portion 14 of the swing shaft 10 and the second end portion 17B is arranged on a side opposite to the small diameter portion 14 of the swing shaft 10 with respect to the first end portion 17A. As shown in FIG. 4, when the fixing member 17 is rotated in a direction opposite to the recessed portion 12 and is brought into the second posture in a state where the mast 5 is separated from the upper slewing body 3, the fixing hole 16 engages with the holding portion 18 and hence, the fixing member 17 can be held by the holding portion 18 in a state where the fixing member 17 is rotated in a direction opposite to the recessed portion 12. That is, the second end portion 17B in a state where the fixing member 17 assumes the first posture and the second end portion 17B in a state where the fixing member assumes the second posture are arranged on sides opposite to each other with respect to the first end portion 17A (support shaft hole portion 17S). Both the fixing member 17 in the first posture and the fixing member 17 in the second posture are arranged so as to extend in a horizontal direction.

In this manner, the fixing member 17 is held by the holding portion 18. Accordingly, it is possible to prevent the occurrence of a drawback that, during an operation of connecting the mast 5 to the upper slewing body 3 by hoisting the mast 5 using the auxiliary crane, the fixing member 17 is suspended downward so that the swing shaft 10 is hardly visually recognized thus making the connection operation difficult or the fixing member 17 is brought into contact with other objects so that the fixing member 17 is damaged.

For enabling the removal or insertion of the small diameter portion 14 of the swing shaft 10 or the holding portion 18 from or into the fixing hole 16 of the fixing member 17, the support shaft 15 protrudes more sideward than the swing shaft 10 and the holding portion 18. With such a configuration, by moving the fixing member 17 to a distal end side of the support shaft 15, the fixing member 17 can be made rotatable about the support shaft 15 without interfering with the swing shaft 10 and the holding portion 18. To reduce a length of the support shaft 15, it is preferable that the position of the distal end of the swing shaft 10 and the position of the distal end of the fixing member 17 be set substantially at the same position in the axial direction of the swing shaft 10.

The fixing member 17 has a handle 19 which can be grasped by an operator. The handle 19 is provided for facilitating an operation of removing or inserting the small diameter portion 14 of the swing shaft 10 and the holding portion 18 by rotating the fixing member 17 about the support shaft 15.

The fixing member 17 may be detachably mounted on the support shaft 15 fixed to the mast 5, or may be mounted on the support shaft 15 in a non-separable manner. The support shaft 15 which supports the fixing member 17 may be detachably mounted on the mast 5.

Figure 5:
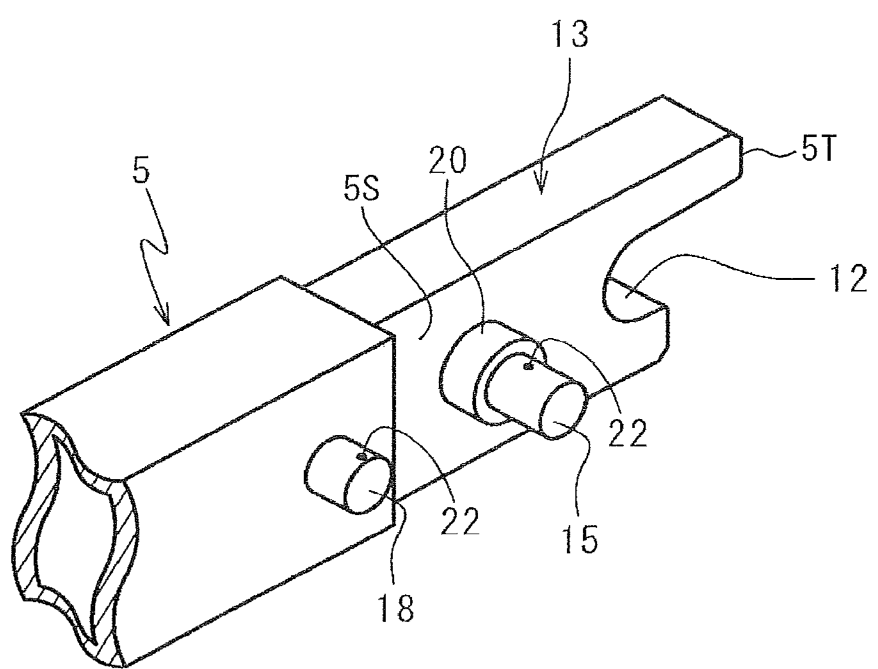
FIG. 5 is a schematic perspective view showing a second member shown in FIG. 4.

As shown in FIG. 5, the mast 5 (second connecting portion 5A) further has a spacer 20 (constraining portion) which constrains the fixing member 17 at an inner side of the support shaft 15 in the axial direction (defines a moving end of the fixing member 17). In an example shown in the drawings, the spacer 20 is mounted on a proximal end side of the support shaft 15. The spacer 20 is formed in a circular columnar shape coaxial with the support shaft 15, has a diameter larger than that of the support shaft 15, and is integrally formed with the support shaft 15. The spacer 20 restricts a movable range of the fixing member 17 such that an end portion (first end portion 17A) of the fixing member 17 on a support shaft 15 side cannot move toward the inside in the axial direction beyond the proper position for allowing the fixing hole 16 to engage with the small diameter portion 14 of the swing shaft 10. With the provision of the spacer 20, it is possible to prevent the fixing member 17 from being inclined with respect to the swing shaft 10 or the support shaft 15.

Since the mast 5 has the spacer 20 for restricting the movement of the fixing member 17 in the axial direction, the fixing hole 16 of the fixing member 17 can easily and properly engage with the small diameter portion 14 of the swing shaft 10. Further, it is possible to prevent the occurrence of a drawback that an unintended force acts on the fixing member 17 due to swinging of the mast 5 connected to the upper slewing body 3 or the like so that the fixing member 17 is damaged, or a drawback that a seizure occurs between the fixing member 17 and the support shaft 15, the swing shaft 10 or the holding portion 18.

A pin hole 22 is formed, in a radial direction, in the small diameter portion 14 of the swing shaft 10, the support shaft 15 and the holding portion 18 respectively. The pin hole 22 penetrates a portion of the small diameter portion 14 of the swing shaft 10, a portion of the support shaft 15 and a portion of the holding portion 18 exposed to the outside of the fixing member 17 in a state where the small diameter portion 14 of the swing shaft 10, the support shaft 15 or the holding portion 18 is inserted into the fixing hole 16 of the fixing member 17. A lock pin 21 which prevents the removal of the fixing member 17 is inserted into these pin holes 22.

It is preferable that, a removal preventing member 23 such as a snap pin, for example, which prevents the removal of the lock pin 21 itself from the pin hole 22 be provided to a distal end portion of the lock pin 21 which penetrates the small diameter portion 14 of the swing shaft 10, the support shaft 15 or the holding portion 18 and is exposed to the outside.

As described above, in the swingable connection structure 1, the mast 5 can be easily connected to the upper slewing body 3 by making the recessed portion 12 engage with the swing shaft 10 in the radial direction of the swing shaft 10 without removing or inserting the swing shaft 10 in the axial direction.

In the swingable connection structure 1, since the small diameter portion 14 of the swing shaft 10 is inserted into the fixing hole 16 of the fixing member 17 formed in the side surface 5S of the mast 5, the relative movement of the swing shaft 10 from the inside of the recessed portion 12 toward the opening side is suppressed, thus preventing the removal of the mast 5 from the upper slewing body 3. In the swingable connection structure 1, at the time of connecting the mast 5 to the upper slewing body 3, it is unnecessary for an operator to perform an operation under the suspended mast 5 (suspended load) or an operation which requires insertion of a hand of the operator under the mast 5, and the operator can perform all operations from the outside of the mast 5 as viewed in a plan view. Accordingly, the swingable connection structure 1 is excellent not only from a viewpoint of operation efficiency but also from a viewpoint of safety.

In the swingable connection structure 1, at the time of separating the mast 5 from the upper slewing body 3 and, thereafter, transporting the mast 5, the fixing member 17 can be fixed to the mast 5 by the holding portion 18. Accordingly, it is unnecessary to transport the fixing member 17 separately at the time of transporting the crane 100 in a disassembled state. Accordingly, the swingable connection structure 1 is excellent in transportability. Further, the fixing member 17 is fixed using the holding portion 18. Accordingly, at the time of transporting the crane 100 in a disassembled state, it is possible to suppress the occurrence of a drawback that the fixing member 17 hangs down from the mast 5 so that operability is impaired. Further, an operation of storing the mast 5 in a transporting case and an operation of loading the mast 5 on a trailer can be also performed easily.

The above-mentioned embodiment is not intended to limit the configuration of the present invention. Accordingly, it should be construed that the above-mentioned embodiment can be modified by omission, replacement or addition of constitutional elements of respective parts of the embodiment based on the description of this specification and the common general technical knowledge, and all these modifications also fall within the scope of the present invention.

The swingable connection structure according to this embodiment is not limited to the connection between the upper slewing body and the mast, and is widely applicable to the swingable connection between an arbitrary first member and an arbitrary second member. As an example, also in the crane of the present invention, the swingable connection structure according to the present invention is applicable to the connection between the boom and the upper slewing body, the connection between the boom and a jib or a strut or the like. It is preferable that the swingable connection structure according to the present invention be adopted to a portion where a large force does not act in a direction that the second member is separated from the first member.

In the swingable connection structure according to the present invention, the spacer can be omitted. Further, the spacer may be disposed on an inner surface side of the fixing member, or may be disposed at a position different from the support shaft in an independent manner Particularly, by providing a cylindrical spacer which is engaged with an outer periphery of a support shaft in a slidable manner on an inner surface side of the fixing member, it is possible to prevent the fixing member from being inclined with respect to the support shaft.

The holding portion of the swingable connection structure according to the present invention is not an indispensable configuration. The fixing member may hang down in a separation state, or the fixing member may be fixed in a state where the fixing member is rotated in a direction opposite to the recessed portion using a sling or the like. Further, the holding portion of the swingable connection structure according to the present invention is not limited to the holding portion having a shaft shape capable of being inserted into the fixing hole formed in the fixing member. The holding portion may have any configuration provided that the holding portion can hold the fixing member such as the configuration in which the fixing member is placed on an upper surface of the holding portion.

In the swingable connection structure according to the present invention, as the configuration for preventing the removal of the fixing member from the swing shaft, the support shaft and the holding portion, besides the lock pin, an arbitrary configuration can be adopted such as a snap ring, a keeper plate, or a bolt which threadedly engages with the swing shaft, the support shaft and the holding portion.

The swingable connection structure according to the present invention can be favorably used particularly as the structure for connecting heavy objects to each other in a swingable manner, for example, the connection structure (derrick body) capable of being raised or lowered such as a mast, a boom, and a strut of a crane.

As described above, the present invention provides the swingable connection structure for swingably connecting the first member and the second member to each other, and the swingable connection structure includes: the first connecting portion which forms the portion of the first member; the second connecting portion which forms the portion of the second member, and is connected to the first connecting portion in a swingable manner about the horizontal swing center axis; and the swing holding member which holds a swingable state of the second connecting portion with respect to the first connecting portion. The first connecting portion has the swing shaft which extends in a horizontal direction and in which the center axis of the swing shaft forms the swing center axis, the second connecting portion has: the pair of side surfaces which respectively intersect with an axial direction of the swing shaft and are arranged on sides opposite to each other; the connecting surface which connects the pair of side surfaces to each other along the axial direction; and the pivotally supported portion which is disposed on the connecting surface of the second member, receives the swing shaft along a direction orthogonal to the axial direction, and is fitted on the swing shaft such that the second connecting portion is swingable about the swing center axis, the swing holding member includes: the first end portion which is supported on one side surface out of the pair of side surfaces of the second connecting portion in a rotatable manner about the horizontal rotary center axis; and the second end portion which is disposed on a side opposite to the first end portion, the second end portion being provided with the constraining hole which allows insertion of one end portion of the swing shaft in an axial direction along the axial direction, and in a state where the one end portion of the swing shaft is inserted into the constraining hole, the swing holding member constrains a relative position of the second connecting portion with respect to the swing shaft in the radial direction of the swing shaft, and the swing holding member swings together with the second connecting portion about the swing center axis.

In the swingable connection structure, the first connecting portion of the first member has the swing shaft which defines the swing center axis of the second connecting portion of the second member, and the second connecting portion of the second member has the pivotally supported portion which receives the swing shaft. Accordingly, the second connecting portion can be easily connected to the first connecting portion by making the pivotally supported portion engage with the swing shaft along the radial direction of the swing shaft without removing or inserting the swing shaft in the axial direction. Further, in the swingable connection structure, by inserting one end portion of the swing shaft into the constraining hole of the fixing member disposed on one side surface of the second connecting portion in a rotatable manner, it is possible to prevent the removal of the second connecting portion from the first connecting portion.

In the swingable connection structure, the first connecting portion may have a pair of swing shaft support portions which are disposed spaced apart from each other in an axial direction of the swing shaft, respectively includes a constraining surface which constrains the second connecting portion in the axial direction, and supports the swing shaft, and the pivotally supported portion of the second connecting portion may be supported on the swing shaft between the pair of swing shaft support portions in a state where the pair of side surfaces are disposed so as to respectively opposedly face the constraining surfaces of the pair of swing shaft support portions.

In this manner, the first connecting portion has the pair of swing shaft support portions which hold the swing shaft and hence, the swing shaft can he easily held with certainty. The pivotally supported portion of the second connecting portion is inserted between the pair of swing shaft support portions and hence, the pivotally supported portion can be positioned in the axial direction by sandwiching the pivotally supported portion by the constraining surfaces of the pair of swing shaft support portions. The positioning of the pivotally supported portion of the second connecting portion with respect to the swing shaft in the axial direction and the connection between the second connecting portion to the first connecting portion can be performed by the pivotally supported portion and hence, the accuracy of the correction can be enhanced while facilitating the connection between the second connecting portion and the first connecting portion.

In the swingable connection structure, the swing holding member may be configured to change a posture between a first posture and a second posture along rotation of the swing holding member about the rotary center axis, the first posture may be a posture in which the constraining hole of the second end portion is capable of receiving the one end portion of the swing shaft, the second posture may be a posture in which the swing holding member is rotated about the rotary center axis from the first posture and the second end portion is disposed on a side opposite to the one end portion of the swing shaft with respect to the first end portion, and the second connecting portion may have a holding portion for holding the second end portion in a state where the swing holding member assumes the second posture.

In this manner, the second connecting portion has the holding portion which holds the swing holding member in a rotated manner and hence, it is possible to prevent the swing holding member from interfering with an operation of making the pivotally supported portion engage with the swing shaft.

In the swingable connection structure, the second connecting portion may have a constraining portion for constraining the swing holding member in an axial direction of the swing shaft.

In this manner, the second connecting portion has the constraining portion for constraining the position of the swing holding member in the axial direction of the swing shaft and hence, an operation of making the fixing hole of the swing holding member engage with the end portion of the swing shaft is facilitated and, at the same time, a change in position of the swing holding member is prevented.

In the swingable connection structure, the second connecting portion may have a support shaft which is fixed to the one side surface in a state where the support shaft extends parallel to the swing shaft, a support shaft hole portion which allows insertion of the support shaft along an axial direction of the swing shaft may be formed in the first end portion of the swing holding member, and along with insertion of the support shaft into the support shaft hole portion along an axial direction, the swing holding member may be rotatably supported on the support shaft about the rotary center axis.

In this manner, the second connecting portion has the support shaft on the side surface thereof in a protruding manner parallel to the swing shaft, and the swing holding member is mounted on the support shaft in an axially slidable manner and hence, the fixing hole can be accurately made to engage with the end portion of the swing shaft in the axial direction. Accordingly, rattling between the fixing hole and the swing shaft can be reduced, and relative position between the first connecting portion and the second connecting portion can be held more accurately.

Further, the crane according to one embodiment of the present invention includes the above-mentioned swingable connection structure. The crane includes the swingable connection structure and hence, a disassembling operation and an assembling operation can be easily performed. Accordingly, in the case where the crane is relatively large so that it is necessary to convey the crane in a disassembled manner and to assemble the crane at a work site, the disassembling operation and the assembling operation particularly at a work site can be performed efficiently.

The crane may include: a lower traveling body; an upper slewing body which is supported on the lower traveling body in a slewable manner about a slewing center axis extending in a vertical direction; and a derrick body which is supported on the upper slewing body in a state where the derrick body is capable of being raised and lowered. The upper slewing body may form the first member, and the mast may form the second member. In this manner, the first member is the upper slewing body which is mounted on the lower traveling body in a slewable manner, and the second member is the derrick body and hence, the derrick body can be easily mounted on or dismounted from the upper slewing body, thus facilitating disassembling and transportation of the crane.

This application is based on Japanese Patent Application 2018-098823 filed to Japanese Patent Office on May 23, 2018 and the content of the application is incorporated herein by reference.

Although the present invention has been fully described by way of example with reference to the accompanying drawings, it is to be understood that various changes and modifications will be apparent to those skilled in the art. Therefore, unless otherwise such changes and modifications depart from the scope of the present invention hereinafter defined, they should be construed as being included therein.

The invention claimed is:

1. A swingable connection structure for swingably connecting a first member and a second member to each other, the swingable connection structure comprising:

a first connecting portion which forms a portion of the first member;

a second connecting portion which forms a portion of the second member, and is connected to the first connecting portion in a swingable manner about a horizontal swing center axis; and a swing holding member which holds a swingable state of the second connecting portion with respect to the first connecting portion, wherein the first connecting portion has a swing shaft which extends in a horizontal direction and in which a center axis of the swing shaft forms the swing center axis, the second connecting portion has: a pair of side surfaces which respectively intersect with an axial direction of the swing shaft and are arranged on sides opposite to each other; a connecting surface which connects the pair of side surfaces to each other along the axial direction; and a pivotally supported portion which is disposed on the connecting surface of the second member, receives the swing shaft along a direction orthogonal to the axial direction, and is fitted on the swing shaft such that the second connecting portion is swingable about the swing center axis, the swing holding member includes:

a first end portion which is supported on one side surface out of the pair of side surfaces of the second connecting portion in a rotatable manner about a horizontal rotary center axis; and a second end portion which is disposed on a side opposite to the first end portion, the second end portion being provided with a constraining hole which allows insertion of one end portion of the swing shaft in an axial direction along the axial direction, and in a state where the one end portion of the swing shaft is inserted into the constraining hole, the swing holding member constrains a relative position of the second connecting portion with respect to the swing shaft in a radial direction of the swing shaft, and the swing holding member swings together with the second connecting portion about the swing center axis.

2. The swingable connection structure according to claim 1, wherein the first connecting portion has a pair of swing shaft support portions which are disposed spaced apart from each other in an axial direction of the swing shaft, respectively includes a constraining surface which constrains the second connecting portion in the axial direction, and supports the swing shaft, and the pivotally supported portion of the second connecting portion is supported on the swing shaft between the pair of swing shaft support portions in a state where the pair of side surfaces are disposed so as to respectively opposedly face the constraining surfaces of the pair of swing shaft support portions.

3. The swingable connection structure according to claim 1, wherein the swing holding member is configured to change a posture between a first posture and a second posture along rotation of the swing holding member about the rotary center axis, the first posture is a posture in which the constraining hole of the second end portion is capable of receiving the one end portion of the swing shaft, the second posture is a posture in which the swing holding member is rotated about the rotary center axis from the first posture and the second end portion is disposed on a side opposite to the one end portion of the swing shaft with respect to the first end portion, and the second connecting portion has a holding portion for holding the second end portion in a state where the swing holding member assumes the second posture.

4. The swingable connection structure according to claim 1, wherein the second connecting portion has a constraining portion for constraining the swing holding member in an axial direction of the swing shaft.

5. The swingable connection structure according to claim 1, wherein the second connecting portion has a support shaft which is fixed to the one side surface in a state where the support shaft extends parallel to the swing shaft, a support shaft hole portion which allows insertion of the support shaft along an axial direction of the swing shaft is formed in the first end portion of the swing holding member, and along with insertion of the support shaft into the support shaft hole portion along an axial direction, the swing holding member is rotatably supported on the support shaft about the rotary center axis.

6. A crane comprising:

a lower traveling body;

an upper slewing body which is supported on the lower traveling body in a slewable manner about a slewing center axis extending in a vertical direction; and the swingable connection structure according to claim 1.

7. The crane according to claim 6, further comprising a derrick body which is supported on the upper slewing body in a state where the derrick body is capable of being raised and lowered, wherein the upper stewing body forms the first member, and the derrick body forms the second member.

* * * * *